May 8, 1962 G. B. GRONVOLD 3,033,390
AUTOMOBILE HANDLING AND STORAGE APPARATUS
Filed Dec. 19, 1960 3 Sheets-Sheet 1

INVENTOR.
GEORGE B. GRONVOLD
BY
ATTORNEY

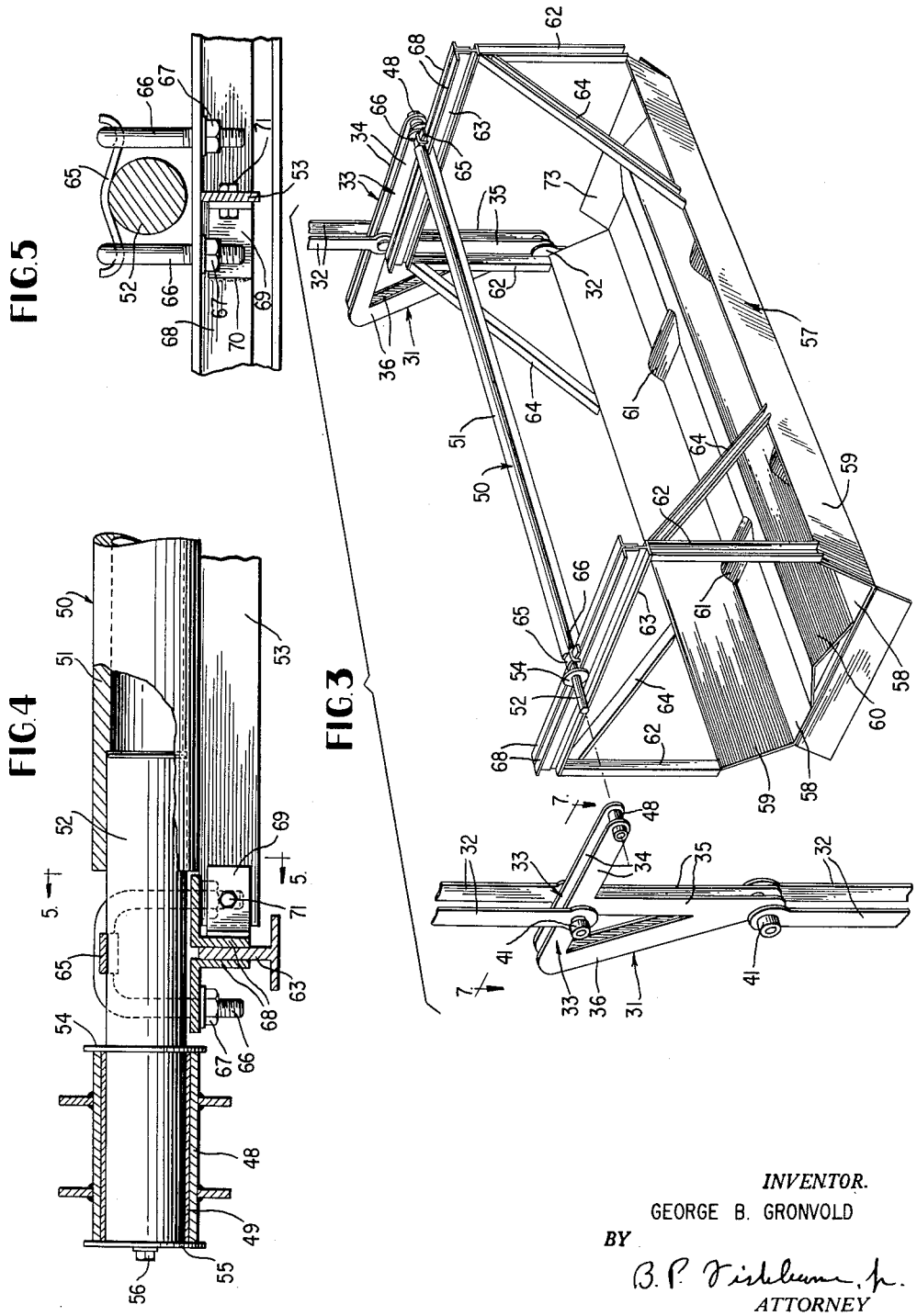

May 8, 1962   G. B. GRONVOLD   3,033,390
AUTOMOBILE HANDLING AND STORAGE APPARATUS
Filed Dec. 19, 1960   3 Sheets-Sheet 3
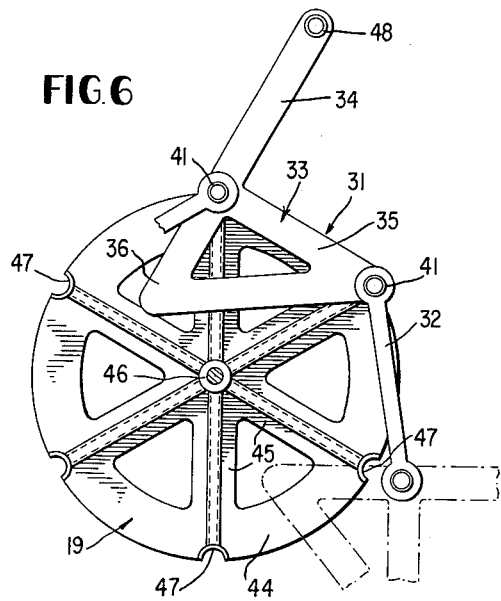
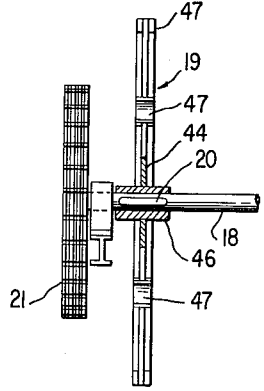
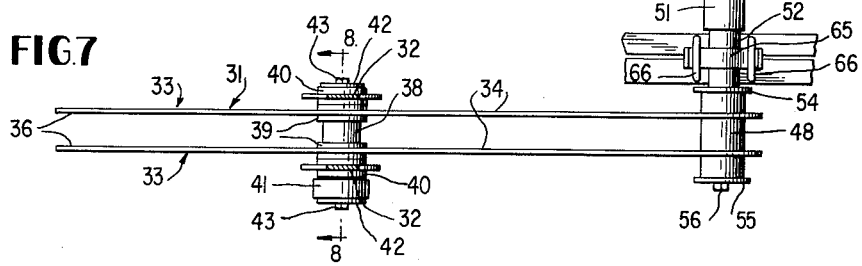
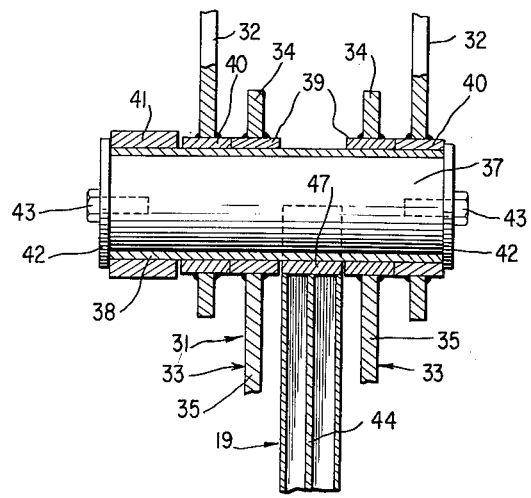
INVENTOR.
GEORGE B. GRONVOLD
BY
ATTORNEY United States Patent Office 3,033,390
Patented May 8, 1962

3,033,390
AUTOMOBILE HANDLING AND STORAGE
APPARATUS
George B. Gronvold, 800 4th St. SW., Washington, D.C.
Filed Dec. 19, 1960, Ser. No. 76,860
4 Claims. (Cl. 214—16.1)

This invention relates to automobile handling and storage apparatus.

An object of the invention is to provide power-operated apparatus of the above-mentioned character to facilitate rapidly and efficiently handling automobiles in congested areas where parking spaces are few and the cost of ground is at a premium.

A further and more specific object is to provide apparatus for handling and parking automobiles which allows loading and unloading of the automobiles at a plurality of levels in a building or garage.

A further object is to provide apparatus of the mentioned character which dispenses with the necessity for expensive conveyer chains which are subject to great wear and are difficult to replace.

Still another object is to provide apparatus of the mentioned type including a novel and simplified endless conveyer element utilizing cantilever links and relatively small driving wheels which coact with the links in an efficient manner.

A further object is to provide apparatus of the mentioned type which is rugged and durable, highly compact, efficient in operation and requiring very little maintenance.

A further object is to provide a novel arrangement of cantilever links and automobile storage racks which are unobstructed by said links to facilitate the easy passage of automobiles onto and off of the racks at various elevations.

Other objects and advantages of the invention will be apparent during the course of the following description.

Figure 1:
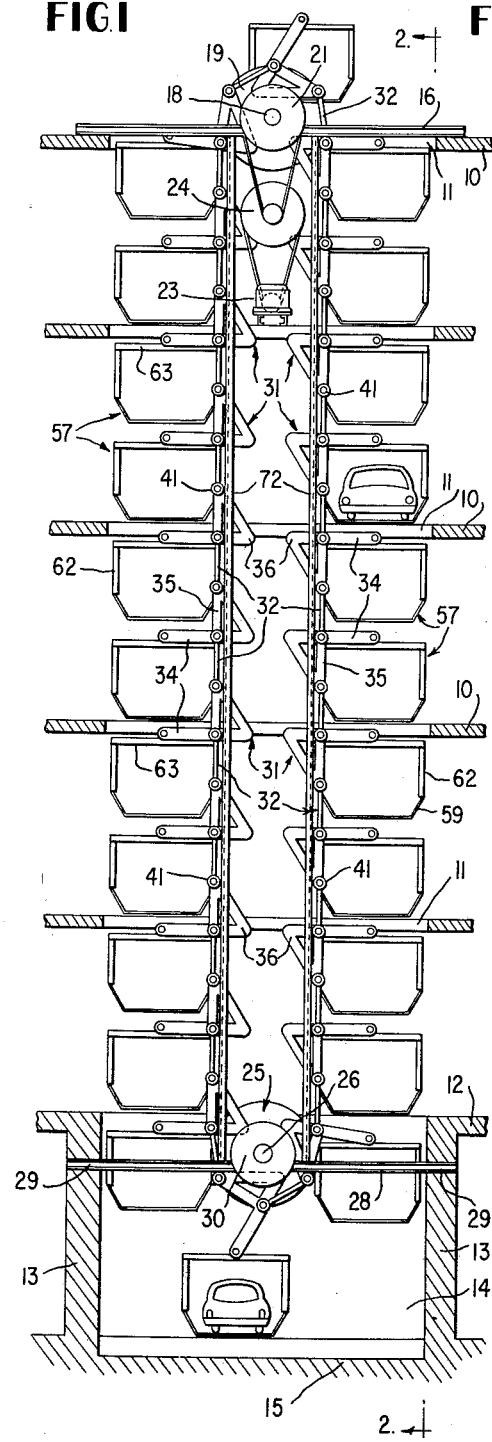
Figure 2:
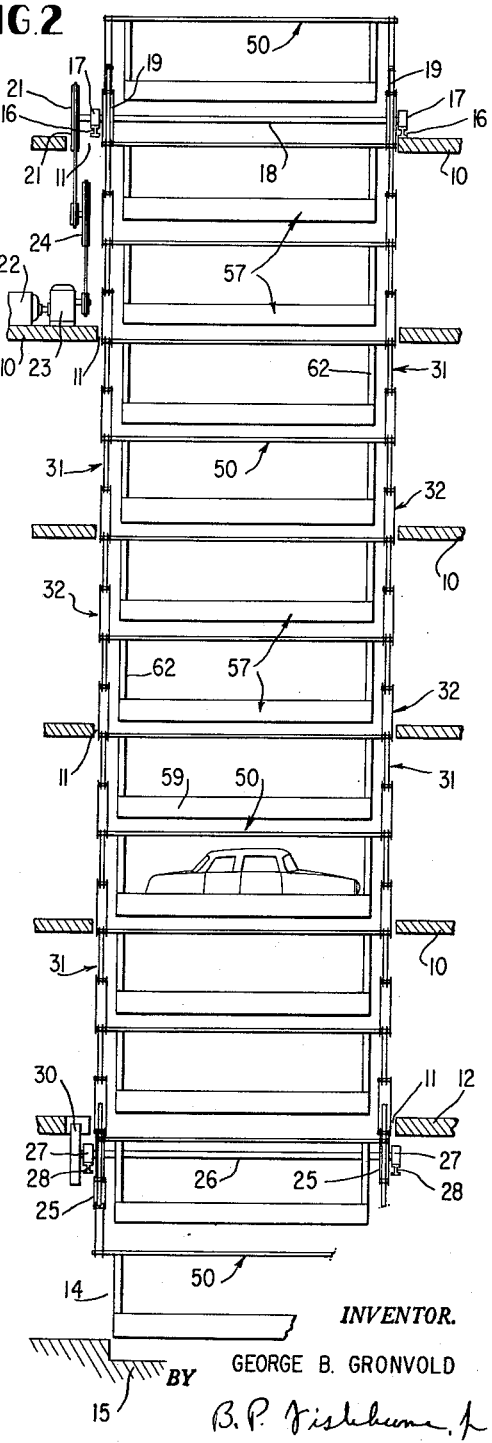

In the accompanying drawings forming a part of this application and in which like numerals are employed to designate like parts throughout the same, FIGURE 1 is a side elevation, partly diagrammatic, of an automobile handling and storage apparatus according to the invention, FIGURE 2 is a vertical section taken substantially on line 2—2 of FIGURE 1, FIGURE 3 is a perspective view, partly exploded, of an automobile storage rack and associated elements forming a part of the apparatus, FIGURE 4 is an enlarged fragmentary vertical section through a storage rack hanger shaft and associated elements, FIGURE 5 is a fragmentary transverse vertical section taken on line 5—5 of FIGURE 4, FIGURE 6 is a fragmentary side elevation partly in section of a drive wheel and associated elements, FIGURE 7 is a fragmentary horizontal section taken substantially on line 7—7 of FIGURE 3, FIGURE 8 is an enlarged fragmentary vertical section taken on line 8—8 of FIGURE 7, FIGURE 9 is an enlarged fragmentary vertical section through a drive wheel and associated elements as shown in FIGURE 2.

In the drawings, wherein for the purpose of illustration there is shown a preferred embodiment of the invention, attention is directed first to FIGURES 1 and 2 showing the apparatus assembled for use in a multi-level building or garage structure having a plurality of vertically equidistantly spaced floors 10 having aligned openings 11 to permit the free passage vertically of the conveyer structure embodied in the apparatus. In the building structure, below the first floor level 12, there may be provided spaced upstanding walls 13 defining a passage 14 above a sub-grade level or floor 15, as shown.

A pair of horizontal beams 16 are rigidly mounted upon the uppermost floor 10 adjacent opposite sides of the uppermost opening 11. Bearings 17 rigidly mounted upon the beams 16 support a horizontal drive shaft 18 rotatably. A pair of drive wheels 19 to be described in detail hereinafter are keyed at 20, FIGURE 9, to the shaft 18 for rotation therewith, near and inwardly of the bearings 17 and within the uppermost opening 11.

Outwardly of one bearing 17, a drive sprocket or pulley 21 is secured to one end of shaft 18 for turning the latter and the sprocket 21 is disposed vertically as shown. A drive motor 22 and associated speed reducer 23 are rigidly mounted on the next lowermost floor 10 outwardly of the adjacent floor opening 11. Suitable belt or sprocket chain gearing 24 interconnects the speed reducer 23 and the upper sprocket 21, as shown somewhat diagrammatically in FIGURES 1 and 2. The drive mechanism for the shaft 18 may be largely conventional and the controls for the drive mechanism are conventional and form no part of the invention and need not therefore be described herein. It is desired not to limit the invention to a particular type of power-operated drive means and the present illustration in FIGURES 1 and 2 is merely an example of a preferred type of drive means for the apparatus. A feature of the invention is, however, to have the drive means for the shaft 18 mounted separately from the apparatus proper upon the second uppermost floor 10 and below the shaft 18 as illustrated, so that the drive means is entirely clear of the endless conveyer structure which passes through the several floor openings 11 continuously during the operation of the apparatus.

Companion driven or idler wheels 25 are arranged adjacent the lowermost floor 12 within the opening or passage 14 and secured to a horizontal shaft 26 for rotation therewith. The shaft 26 is journaled for rotation upon fixed bearing 27, rigidly secured to horizontal beams 28, in turn fixedly anchored to the walls 13 as at 29. The driven wheels 25 are adapted to turn in unison with the shaft 26 and are in vertical alignment with the upper drive wheels 19, as shown in FIGURE 2. Suitable conventional brake means 30 for the shaft 26 is connected therewith, FIGURE 2, and the conventional brake means is preferably electrical in nature and controlled by the conventional controls, not shown, for the motor 22 and associated elements.

The endless flexible conveyer structure forming the heart of the present invention comprises a multiplicity of alternately arranged cantilever and straight rigid links 31 and 32, pivotally interconnected in a manner to be described and forming endless flexible elements at opposite sides of the apparatus engageable with the wheels 19 and 25, as shown in FIGURES 1 and 2. In each such endless flexible element, each cantilever link 31 comprises a pair of spaced link portions 33 having a horizontal cantilever arm 34, a vertical leg 35, and an angular elbow portion 36, all integrally joined as best shown in FIGURE 3. The straight links 32 of each endless flexible element are also formed in companion pairs or sections, FIGURE 3, for pivotal connection with the cantilever links adjacent the top and bottom of the vertical legs 35. The straight links 32 are disposed outwardly of the cantilever links 31, as shown.

With reference to FIGURES 7 and 8 showing the construction of a typical pivotal connection between the links 31 and 32 at the top or bottom of the legs 35, each such pivotal connection embodies a pin or roller 37, preferably having an exterior bronze sleeve 38 rigid therewith. Each cantilever link section 33 has short sleeve portions 39 adjacent the top and bottom of the vertical leg 35, rotatably receiving the pin 37 and sleeve 38, as shown in FIGURE 8, and the sleeve portions 39 are spaced apart axially upon the sleeve 38 as indicated. Outwardly of the cantilever link sections 33, each straight link 32 has a short sleeve portion 40, likewise rotatably receiving the sleeve 38, FIGURE 8. At its outer end, each pin 37 and sleeve 38 has a guide roller 41 journaled thereon for free rotation, and the several links and roller are held captive upon each pin 37 by end flat washers 42, secured to the ends of the pin 37 by screws 43 or the like. As stated, the pivotal connection shown in detail in FIGURE 8 is typical of the connection between the cantilever links 31 and straight links 32 at the top or bottom of the vertical legs 35, and a single illustration and description of this connection will suffice to describe all of the pivotal connections between the several cantilever and straight links of both endless flexible conveyer elements shown in FIGURES 1 and 2.

With continued reference to the drawings, each wheel 19 and 25 comprises an annular disc portion 44 having preferably six radial spokes 45 integral therewith and spaced apart equidistantly circumferentially. Each wheel further embodies a central hub 46 receiving the shaft 18 or 26 and keyed thereto at 20 as previously described. Adjacent the spokes 45, each wheel is provided in its periphery with a corresponding number of equidistantly spaced semi-circular notches or sockets 47, as shown, engageable with each sleeve 38 between the sleeve portions 39 of cantilever link sections 33, FIGURE 8. By this arrangement, the upper drive wheels 19 positively engage and drive the pair of endless conveyer elements shown in FIGURE 2, and as best shown in FIGURE 6 the sections 33 of the cantilever links 31 and the companion sections of straight links 32 straddle the disc portion 44 of the wheels during passage of the links around the wheels as the latter rotate with their sockets 47 successively engaging the sleeves 38 as described. The arrangement is highly compact and sturdy and allows positive driving of the flexible conveyer elements without slippage and with a minimum of wear. The lower driven wheels 25 engage and coact with the endless conveyer elements in the identical manner above-described in connection with FIGURE 6.

Each pair of cantilever arms 34 of each cantilever link 31 have their free ends rigidly connected by a short sleeve 48, preferably provided with a liner 49 of bronze or the like. Associated with each pair of cantilever links 31 at opposite sides of the apparatus, FIGURE 3, is a rack hanger shaft 50 including a tubular body portion 51 having solid end shaft extensions 52 rigidly anchored telescopically in its opposite ends. A vertical rib 53 is rigidly secured to the bottom of each tubular shaft body portion 51 throughout its length to render the same more rigid. The outer end portion of each shaft extension 52 is rotatably received within the adjacent liner 49, FIGURE 4, and a flat washer 54 is mounted upon each shaft extension 52 inwardly of the sleeve 48, as shown. A second washer 55 is secured at 56 to the outer end of each solid shaft extension 52 to maintain the sleeve 48 thereon. Each hanger shaft 50 is therefore bodily carried rotatably by a pair of the cantilever links 31 at opposite sides of the apparatus, and the shafts 50 are horizontal and equidistantly spaced apart vertically upon the endless conveyer elements composed of the links 31 and 32.

Each hanger shaft 50 carries an automobile storage rack 57 suspended therefrom and extending lengthwise thereof below the shaft 50. Each rack 57 embodies a sheet metal floor having spaced horizontal automobile wheel receiving runways 58, bounded on their outer sides by upwardly inclined flanges 59 which tend to center the automobile wheels and prevent scraping of the sides of the automobile against the sides of the rack. A central longitudinal hump 60 in the floor of each rack serves to engage the wheels of narrow gage foreign automobiles and the like to aid in centering the same upon the rack 57. Wheel chocks 61 are preferably formed in each runway 58 as shown to prevent the automobile on the rack from accidentally rolling thereon should the brake thereof be released. Each rack 57 has upstanding open end frames rigidly secured thereto, including vertical posts 62 and top horizontal bars 63, rigidly secured thereto and spanning the top of the rack transversely. Diagonal braces 64 may also be provided, as shown. Hanger straps 65 engage across the tops of the end shaft extensions 52 between the washers 54 and the ends of the tubular shaft body portion 51, and pairs of U-bolts 66 suspended from the opposite ends of the hanger straps 65 are secured at 67 to back-to-back angle bars 68, rigidly secured by welding or the like to the bars 63. By this means, each rack 57 is pivotally suspended at its opposite ends from a hanger shaft 50 inwardly of the pair of endless flexible conveyer elements previously described. To further strengthen the assembly, L-brackets 69 are welded at 70 to the adjacent angle bars 68 and are detachably rigidly secured at 71 to the ends of the reinforcing rib 53.

Each rack 57 may be detached when necessary from its shaft 50 by releasing the bolt means 66 and 71, as should be obvious.

Pairs of straight parallel vertical guide rails 72, FIGURE 1, extend between the upper beams 16 and the lower beams 28 and are suitably rigidly connected thereto. The guide rollers 41 of the endless conveyer elements constantly engage the outer faces of the rails 72, as shown in FIGURE 1, during the movement of the racks 57 upwardly or downwardly between the wheels 19 and 25. The arrangement is such that the guide rails 72 resist the tendency of the cantilever links 31 to pivot or turn due to the weight of the racks upon their arms 34 and such arms are maintained level or horizontal by the rails 72 and rollers 41 at all times between the wheels 19 and 25. At the ends of the guide rails 72, the pins 37 and sleeves 38 are engaged smoothly by the sockets 47 of the wheels as previously described.

In operation, the endless conveyor elements carrying the racks 57 may be driven in either direction by the motor 22 and associated gearing controlled by conventional means not shown. The brake 30 may bring the apparatus to a halt at any point. The vertical columns of racks 57 pass through the floor openings 11 in a continuous manner and loading and unloading of the automobiles may take place at any floor level in the building structure as well as at the sub-grade level 15, if desired. In the construction shown, a pair of the vertically spaced racks 57 may be disposed between each adjacent pair of floors 10, FIGURE 1, and one rack 57 may be positioned for loading or unloading longitudinally on each side of the conveyor structure at each floor level 10. In effect, two side-by-side racks 57 may be positioned for loading and unloading at each floor level of the building structure, as shown. As should be obvious, the apparatus is admirably suited for handling a very large number of automobiles quickly and efficiently in a minimum space.

The entire endless conveyor structure is suspended from the upper drive wheels 19 and shaft 18 mounted upon the uppermost floor level 10, as described. The power drive mechanism 22 etc. is conveniently located outside of the conveyor structure on the next lowermost floor 10. The shaft through which the conveyer structure travels, formed by the floor openings 11, is therefore fully open and unobstructed.

As viewed endwise of the racks 57 in FIGURE 1, the cantilever links 31 are generally L-shaped and the horizontal cantilever arms 34 are adjacent the top bars 63 of the racks while the vertical legs 35 of the cantilever links are adjacent the vertical posts 62 at the inner sides of the rack. The racks therefore are entirely unobstructed endwise and the automobiles may pass freely onto or from the racks at any floor level without interference by the cantilever links. The elbow portions 36 which reinforce the links 31 are arranged inwardly of the racks 57, FIG- URE 1, in opposed spaced relation, and due to the construction of the links and their coaction with the wheels 19 and 25 as shown in FIGURE 6, relatively small wheels may be employed and a minimum clearance only need be provided between the vertical runs of the conveyer structure as shown in FIGURE 1. The arrangement renders the apparatus highly compact and allows for the handling of the maximum number of automobiles in the very minimum of space which is the overall object of the invention.

The racks 57 automatically maintain themselves upright at the ends of the cantilever arms 34 in all adjusted positions of the latter, due to the pivotal suspension of the racks from their shafts 50 and the pivotal or rotatable connections between the ends of the shafts 50 and the sleeves 48 of the cantilever arms. Each cantilever link 31 is interconnected with an adjacent pair of cantilever links in the endless conveyer structure through a single pair of the straight links 32 above and below the cantilever link. The straight links 32 are also clear of the racks 57 at all times so as not to obstruct the same for the free passage of the automobiles onto and off of the same at the several floor levels. Wear and maintenance on the endless flexible conveyer structure is held to the absolute minimum with the present design, and the mechanism is far less costly to maintain than the usual sprocket wheel and roller conveyer chain type mechanism. Additionally, when the need arises, the individual racks 57 are readily removable and individual cantilever links 31 or straight links 32 are readily removable and replaceable without the necessity for replacing the entire endless conveyer element.

The shape of the cantilever link 31 is superior to any other known structural shape having adequate strength to support the racks 57 without obstructing the clear endwise passage through the latter. The construction of the apparatus is extremely simple, highly compact and very sturdy and durable, and the same is highly economical to construct as compared to the prior art devices of this general character.

As indicated only in FIGURE 3 for the sake of simplification, small gap bridging ramp extensions 73 are hingedly secured to opposite ends of the floor of each rack 57 to allow smooth passage of the automobile wheels across the small gap between the ends of each rack and the adjacent edges of the floor openings 11. These ramp extensions may be manually operated by hand, or if preferred, suitable means, not shown, may be provided to operate the same remotely or from some point on the associated rack 57.

It is desired to point out particularly that each complete cantilever link 31 has a pair of pivotal connections with the adjacent straight links 32, and the links 32, legs 35 and pivotal connections carrying guide rollers 41 are all arranged in a straight vertical line, maintained by the guide rails 72 between the upper and lower wheels 19 and 25. During passage of each cantilever link 31 around the wheels 19 and 25, the same has its two connections at the ends of the legs 35 locked into and supported by a pair of the notches or sockets 47 of the adjacent wheel, thus providing a sturdy and positive driving connection between the wheels and the linked endless conveyer elements.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. Automobile handling and storage apparatus for use in a multi-floor-level building having aligned floor openings constituting an unobstructed vertical passage in the building for said apparatus, the apparatus comprising a horizontal drive shaft mounted for rotation upon an uppermost floor of the building and spanning said vertical passage transversely, notched drive wheels secured to said shaft within said passage to turn therewith in unison in vertical planes, power-operated means mounted upon the next lowermost floor of said building and operatively connected with said drive shaft to turn the latter in the desired direction, notched driven wheels journaled for rotation in vertical planes near the bottom of said passage and in vertical alignment with said drive wheels, a pair of endless flexible conveyer elements engaged with said drive and driven wheels within said vertical passage near opposite sides thereof and movable vertically under influence of the drive wheels, each conveyer element comprising a multiplicity of rigid cantilever links including horizontal arms and vertical leg portions and alternate straight links interconnecting adjacent pairs of the cantilever links and pivoted thereto adjacent the ends of said leg portions, guide rollers carried by the pivots of the cantilever and straight links, pairs of vertical guide rails extending between said drive and driven wheels near opposite sides of said passage and engaging said rollers to maintain said arms horizontal and said leg portions vertical during passage of the conveyer elements through said vertical passage between said drive and driven wheels, said cantilever links having angular elbow portions projecting inwardly of said guide rails in opposed relation to opposite vertical sides of said conveyer elements, said pivots of each cantilever link successively engaging a pair of notches of the drive and driven wheels while passing about the same during rotation thereof, horizontal equidistantly spaced hanger shafts journaled upon the ends of said horizontal arms within said passage and spaced laterally of said leg portions and straight links and spanning said passage transversely, and a corresponding number of automobile storage racks pivotally suspended freely from said hanger shafts and adapted to remain level in all adjusted positions of said cantilever links.

2. An automobile handling and storage apparatus comprising multi-floor-level support means, a pair of axially spaced notched drive wheels mounted for rotation in vertical planes on said support means near the top thereof, power-operated means for turning said drive wheels in the desired direction, a companion pair of axially spaced notched wheels mounted for rotation upon said support means near the bottom thereof and in alignment with said drive wheels, a pair of endless flexible conveyer elements hung from said drive wheels and also engaging said companion pair of wheels and driven by the drive wheels, each conveyor element comprising a multiplicity of straight links and a multiplicity of cantilever links arranged alternately with the straight links and pivoted thereto, said cantilever links including cantilever arm extensions projecting substantially at right angles to said straight links and angular elbow portions extending beyond the sides of the straight links remote from the arm extensions, automobile racks pivotally suspended from pairs of said arm extensions of the cantilever links at opposite sides of the apparatus and being horizontal in all adjusted positions of the cantilever links, the pivotal connections of the straight and cantilever links interlocking with adjacent pairs of notches in said drive and companion wheels during passage of the conveyer elements therearound as the wheels rotate.

3. Automobile storing and transferring apparatus comprising elevated rigid supporting means, a pair of axially spaced notched drive wheels journaled for rotation in unison upon said elevated supporting means near the top thereof, power means connected with said drive wheels to impart rotation thereto, a companion pair of axially spaced notched wheels journaled for rotation upon said support means near the bottom thereof and aligned vertically with said drive wheels for rotation in unison therewith, a pair of rigid link endless flexible conveyer elements engaging said drive and companion wheels and including alternate straight and triangular links and pivot elements interconnecting said links, said pivot elements adapted to have positive engagement with the notches of said wheels during passage of the conveyer elements around the wheels, said triangular links including vertical link portions in alignment with the straight links and connected horizontal and diagonally inclined link portions projecting inwardly of the straight links and vertical link portions, horizontal outwardly projecting cantilever arm extensions carried by the triangular links and projecting outwardly of the straight links, horizontal hanger shafts extending between and secured to each laterally spaced pair of cantilever arm extensions at opposite sides of the apparatus for movement therewith, and an automobile support rack pivotally suspended from each hanger shaft and disposed bodily outwardly of the straight links and triangular links and being open ended and unobstructed longitudinally for the free passage of automobiles onto and off of the same at any elevation.

4. The invention as defined by claim 3, and pairs of spaced vertical guide rails fixedly secured to the supporting means at opposite sides thereof, and guide rollers arranged in spaced relation on said conveyer elements and engaging the guide rails to stabilize the straight and triangular links and cantilever arm extensions during passage of the same vertically upwardly or downwardly.

References Cited in the file of this patent

UNITED STATES PATENTS

| | | |
|---|---|---|
| 1,724,196 | Harrison | Aug. 13, 1929 |
| 2,619,239 | Hild et al. | Nov. 25, 1952 |
| 2,781,922 | Hibbard | Feb. 19, 1957 |
| 2,829,780 | Boor | Apr. 8, 1958 |

FOREIGN PATENTS

| | | |
|---|---|---|
| 128,425 | Australia | Nov. 28, 1946 |
| 536,923 | Belgium | Apr. 15, 1955 |